United States Patent [19]

Saito et al.

[11] Patent Number: 5,655,075
[45] Date of Patent: Aug. 5, 1997

[54] PROTOCOL METHOD FOR VALIDATING AN INPUT PROTOCOL SPECIFICATION

[75] Inventors: Hironori Saito, Sagamihara; Fumio Nitta, Tokyo, both of Japan

[73] Assignee: Kokusai Denshin Denwa Co., Ltd., Tokyo, Japan

[21] Appl. No.: 440,141

[22] Filed: May 12, 1995

[30] Foreign Application Priority Data

May 12, 1994 [JP] Japan ................. 6-98312

[51] Int. Cl.$^6$ ............................. G06F 11/00
[52] U.S. Cl. ........................... 395/185.01
[58] Field of Search .............. 395/185.01, 183.15, 395/831, 285, 185.02; 364/940.81, DIG. 2

[56] References Cited

U.S. PATENT DOCUMENTS

| | | | |
|---|---|---|---|
| 4,694,422 | 9/1987 | Kakuda et al. ................ | 364/900 |
| 4,754,400 | 6/1988 | Wakahara et al. ............. | 364/300 |
| 5,515,504 | 5/1996 | Le Van Suu .................. | 395/183.04 |

OTHER PUBLICATIONS

C. H. West: "General Technique for Communications Protocol Validation", IBM J. Res. Devel., Jul. 1978.

D. Brand and P. Zafiropulo: "Research Report on Communicating Finite-state Machines", IBM Res. Rep. RZ 1053, 1981.

*Primary Examiner*—Robert W. Beausoliel, Jr.
*Assistant Examiner*—Stephen C. Elmore

[57] ABSTRACT

Validation of an input protocol is divided into two steps. In the first processing step, a state. transition graph of each process including only executable state transitions of each process is generated according to transition information which the protocol specification has, and at the same time, protocol errors related to behavior of the process is detected. In the second processing step, reachable system states among system states defined by combinations of individual process states and individual channel states are successively generated according to transition information which the state transition graph of each process has, and a system state of the generated reachable system states which cannot transit further is detected as a deadlock. In the protocol validation method, every system state can be erased from the memory when a deadlock detection for it is completed, and searching the generated system states is not necessary, and some additional techniques for more efficient validation can be applied. Therefore the protocol validation method enables validation with a practical period of time even for a large-scale or complicated protocol specification without requiring a large-capacity memory.

8 Claims, 9 Drawing Sheets

Process 1

Process 2

FIG. 3

PRIOR ART

| Process name | State name | State transition |
|---|---|---|
| 1 | READY | (−REQ)WAIT, (+ALARM)REGISTER |
| 1 | WAIT | (+DONE)READY, (+ALARM)WAIT |
| 1 | REGISTER | (−ACK)READY |
| 2 | IDLE | (+REQ)SERVICE, (−ALARM)FAULT |
| 2 | SERVICE | (−DONE)IDLE, (+ACK)SERVICE |
| 2 | FAULT | (+ACK)IDLE, (+REQ)FAULT |

Process 1

Process 2

FIG. 9 (a) PRIOR ART
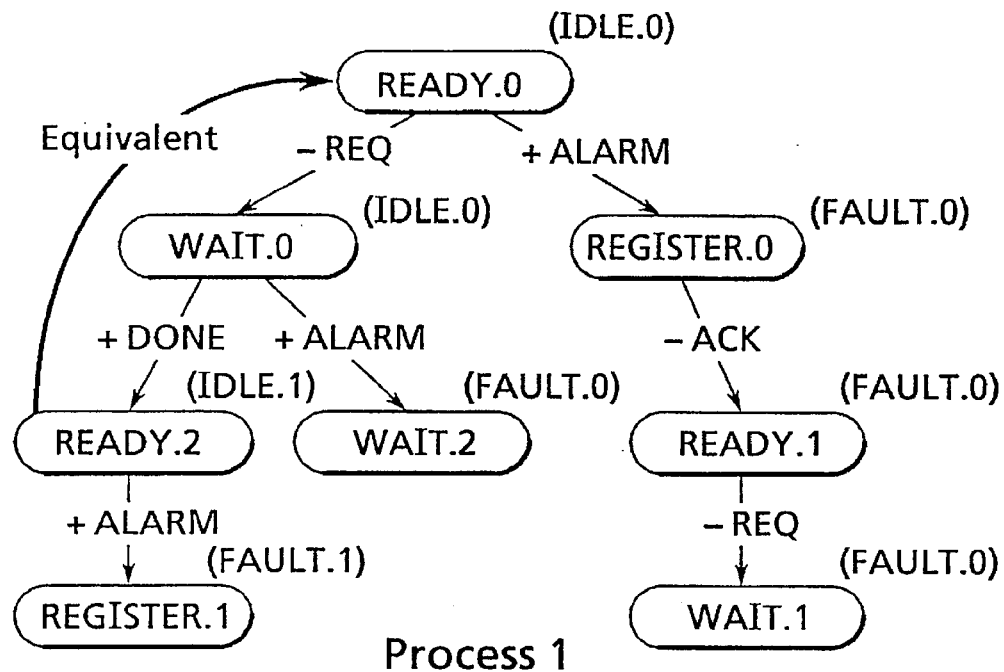
Process 1
FIG. 9 (b) PRIOR ART
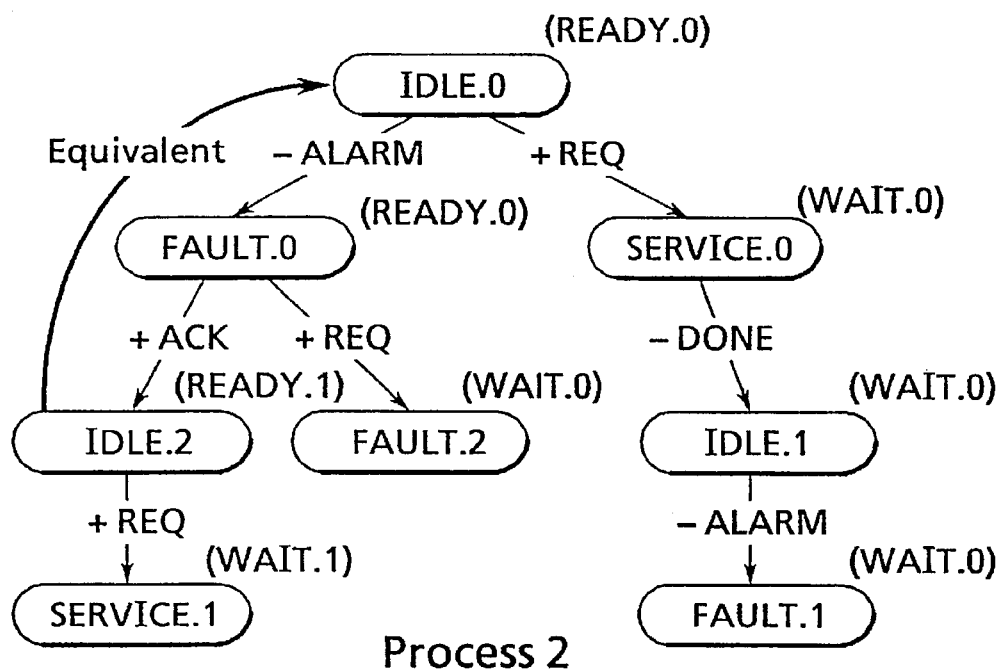
Process 2

PROTOCOL METHOD FOR VALIDATING AN INPUT PROTOCOL SPECIFICATION

FIELD OF THE INVENTION

This invention relates to a protocol validation method which, using a protocol specification as an input, checks the behavior that can be taken by a system when the protocol is implemented to detect protocol errors contained in the input protocol specification.

BACKGROUND OF THE INVENTION

Description of Terms

First, terms appearing in the specification will be defined.

(1) Protocol: protocol means communication rules between modules in a system in which a plurality of modules (various communication devices such as exchanges, terminals, or local function units in the system) achieve a predetermined object as a whole by transmitting and receiving signals.

(2) Process: process means a module which is a communication entity in the protocol.

(3) Channel: channel means a signal transmission line having a directivity present between processes, and transmission and reception of signals are necessarily made through a channel from the transmission process to a reception process.

(4) Transmission and reception: transmission means that a process puts a signal in a channel to a destination process, reception means that a process takes out a signal from the top of a channel from a transmission process, and taking out of the signal from the channel is performed in the order of putting into the channel. There is no time limitation to the reception of the transmitted signal and, therefore, a once transmitted signal is eventually received.

(5) Process state: process state means a state taken by a process when it operates, including various states such as READY or IDLE, WAIT, REGISTER, SERVICE and FAULT, and the process transits its state every time the process transmits or receives a signal. Initial state can be flexibly set.

(6) Send-transition and receive-transition: send-transition means a transition of process state associated with transmission, and receive-transition means a transition of process state associated with reception.

(7) Protocol specification: protocol specification describes behaviors to be taken by individual processes in a system.

(8) Channel state: channel state shows what and how many signals are put in a channel in what order, and when the number of signals is zero, the channel is referred to as empty.

(9) System state: system state is defined as a set of individual process states and individual channel states in the entire system, when transmission or reception is performed, the process state and the channel state are changed, and the system state transits.

(10) Initial system state: initial system state means a system state where all processes are in the initial states and all channels are empty.

(11) Stable state: stable state means a system state where all channels are empty.

(12) Reachable system state: reachable system state means a system state which can be reached by executing executable state transitions from the initial system state, and also means the initial system state itself.

(13) Reachable process state: reachable process state means a process state constituting a reachable system state.

(14) Executable state transition: executable state transition includes an executable send-transition and an executable receive-transition. Executable send-transition means a send-transition from a reachable process state. Executable receive-transition means a receive-transition from a reachable process state, where the reception signal is at the top of channel in a reachable system state including the reachable process state.

(15) Protocol error: protocol specification can be described regardless of the reachability of a system state or the executability of a process state transition. Therefore, the protocol may include a logical contradiction, and a logical contradiction included in the protocol specification is referred to as protocol error. Protocol error includes a deadlock and one which relates to behavior of each process.

(16) Deadlock: deadlock means a system condition which cannot transit any further, since any of processes constituting the system state have no executable state transition.

(17) Protocol error related to operation of each process: this protocol error includes an unexecutable transition, overflow, undefined reception, and the like. The unexecutable transition means a state transition which is defined in the protocol specification but is not executable. Overflow means a state where a process transmits signals beyond a predetermined channel capacity. Undefined reception means a receive-transition which is executable but is not defined in the protocol specification.

Two Conventional Methods

A number of protocol validation methods have been reported in which all system states reachable from the initial state, or necessary subsets thereof, are enumerated (for example, C. H. WEST: General technique for communications protocol validation", IBM J, Res. Devel., July 1978). Such a method is hereinafter referred to as the "first conventional method". On the other hand, those methods in which according to the conditions for the signal to be transmittable and receivable in each process state, executable state transition is investigated for each process to generate a state transition graph of each process have been reported (for example, U.S. Pat. No. 4,754,400 or D. Brand and P. Zafiropulo: "On communicating finite-state machine", IBM Res. Rep. RZ 1053, 1981). Such a method is hereinafter referred to as the "second conventional method".

Description of the First Conventional Method

The first conventional method will be described below. In the first conventional method, based on the protocol specification, executable state transitions are executed one by one from the initial system state to successively generate new reachable system states, which are all stored in a memory. When each system state is generated, it is compared with all system states already generated up to that point to check whether or not the system state has already been generated. If already generated, generation of a new system state of the transition sequence is stopped since transition sequence thereafter is a repetition of the one already generated, and generation of system states in other transition sequences is performed. Thus, a protocol error including a deadlock is detected while generating all reachable system states.

Problems of the First Conventional Method

As described above, system state is defined by a combination of process states and channel states. Therefore, in the first conventional method which enumerates the reachable system states, a system state must be generated even for a single state transition of a single process. This means that the number of system states to be enumerated is greatly increased even if the number of processes is slightly increased, or even if the behavior of the protocol specification becomes a little more complicated. Therefore, when a large-scale or complicated protocol specification is validated in the first conventional method, a memory device having a very large capacity is required to store a number of system states and, as the number of stored system states increases, a very long processing time is required for searching to check whether or not a same system state is already generated.

Description of the Second Conventional Method

The second conventional method will be described with reference to FIGS. 2(a), 2(b), 3, 9(a) and 9(b). FIGS. 2(a) and 2(b) show an example of a protocol specification including two processes, process 1 and process 2. FIG. 3 shows a storage form example in which the protocol specifications shown in FIGS. 2(a) and 2(b) are represented by electrical signals to be stored in the memory. FIGS. 9(a) and 9(b) show a state transition graph of each process generated by the second conventional method when validating the protocol specification shown in FIGS. 2(a) and 2(b).

In the protocol specification example shown in FIGS. 2(a) and 2(b), ovals represent individual states of the individual processes 1 and 2, and state names (READY, WAIT, REGISTER, IDLE, SERVICE, FAULT) are shown in the ovals. Here, underlined state names (READY, IDLE) indicate initial states. An arrow connecting ovals represents state transition, and a name of a signal (REQ, ACK, DONE, ALARM) transmitted or received during the state transition is indicated on the arrow, with "−" for transmission and "+" for reception. Therefore, in the protocol specification of FIG. 2(a), for example, process 1 is specified such that it transits from the initial state READY to the state WAIT by transmitting the signal REQ to the process 2, and it transits from the initial state READY to the state REGISTER when the signal ALARM is received from the process 2 before transmitting the signal REQ. Of the signal names, REQ represents a transmission request signal, ACK represents an affirmative reception response signal, DONE represents a job completion notification signal, and ALARM represents an abnormality alarm signal.

In the protocol specification storage form example shown in FIG. 3, all sets are shown, each of which includes the process name, the process state name, and all state transitions from the state. Each state transition is represented by the signal name with the sign "+" or "−" for transmission or reception in parentheses and the state name of the transition destination.

The state transition graphs of the individual processes 1 and 2 shown in FIGS. 9(a) and 9(b) comprise nodes and arrows, in which an oval node indicates a process state, and an arrow connecting nodes indicates an executable state transition. The state name here is provided with a period "." and a number, and this number is an identifier for distinguishing a state of the same name reached by a different transition sequence. In the same manner as in FIGS. 2(a) and 2(b), a name of a signal transmitted or received during the state transition is provided on the arrow.

Further, each node is provided with a state that each of the other processes should at least have reached at the time when the process reaches the state represented by the node. For simplicity, this state is hereinafter referred to as "least state" of each of other processes for the process state. FIG. 9(a), for example, shows FAULT. 0 as the least state of the process 2 for the state WAIT. 2 of the process 1. This means that for the process 1 to reach the state WAIT. 2, the process 2 must have at least transmitted the signal ALARM to reach FAULT. 0. In the example in FIGS. 9(a) and 9(b), since the number of processes of the system is 2, the least state is only the state of the other process, which is shown in parentheses ( ) on the right upper side of each node.

The procedure of protocol validation by the second conventional method will now be described.

(1) First, an initial node indicating the initial state is generated for each process, and an initial state of each of the other processes is set as a least state of each of other processes for the initial node of each process. For example, for process 2, when an initial node indicating the initial state IDLE. 0 is generated in FIG. 9(b), the initial state READY. 0 of process 1 is set to the initial node of process 2 as the least state of process 1 for the initial state IDLE. 0 of process 2.

(2) Then, addition of an executable send-transition and addition of an executable receive-transition are repeated to generate a state transition graph of each process and, at the same time, all stable states (system state where all channels are empty) are enumerated to detect deadlocks.

(3) The procedure for enumeration of stable states will now be described. First, since the initial system state (e.g. READY 0, IDLE 0) where all processes are in initial states is a stable state, when the initial node of each process is generated to generate the state transition graph of each process, this stable state is generated and stored in the memory as an element of a stable state set. Then, in generating the state transition graph of each process, every time a node is generated by addition of a new receive-transition, an original stable state is found among the existing stable state set, the state before signal transmission in the found stable state is replaced with the state after signal transmission, and the state before signal reception is replaced with the state after signal reception to generate a new stable state. Further, the new stable state is stored in the memory to add it to the stable state set. For example, in FIG. 9(b), when a node representing the state SERVICE. 0 is generated by addition of the receive-transition +REQ of process 2, the original stable state (READY. 0, IDLE. 0) is found among the stable state set, the state READY. 0 of process 1 is replaced with the state WAIT. 0 after execution of the send-transition -REQ, and the state IDLE. 0 of process 2 is replaced with the state SERVICE. 0 after execution of the receive-transition REQ to generate a new stable state (WAIT. 0, SERVICE. 0), which is then added to the stable state set.

(4) On the other hand, in generating the state transition graph of each process, every time a new node is generated by addition of a new executable state transition, the least state of each of other processes for the state represented by that node is set to the node. For example, for process 2, when a node representing the state SERVICE. 0 is generated by addition of the receive-transition of signal REQ to the initial node in FIG. 9(b), the least state WAIT. 0 of process 1 for the state SERVICE. 0 is set.

Further, during the generation of the state transition graph of each process, when two nodes in a process come under all of the conditions A, B, and C shown below, since the state transitions that follow the two nodes are the same, addition of send-transition to one of the two is stopped.

Condition A: state names represented by the nodes are the same except for identifiers.

Condition B: least states set to the nodes are the same except for identifiers.

Condition C: channel states in the system state comprising the states represented by the nodes and the least states set to the nodes are the same.

The above-mentioned state represented by the bode which stops addition of send-transition thereafter for the reason of equivalency is referred for convenience to as equivalence stop state". For example, in process 1 of FIG. 9(a), since the state READY. 2 is equivalent to the state READY. 0, it is an equivalence stop state. However, the state WAIT. 1 and the state WAIT. 2 differ in channel state, and are thus not equivalent. On the other hand, in process 2, since the state IDLE. 2 is equivalent to the state IDLE. 0, it is an equivalence stop state.

(5) A protocol error related to behavior of the process is detected by generating the state transition graph of each process as shown above. That is, in the generation of a state transition graph of a process, when the receive-transition of executable state transition is added, a check is made as to whether or not the receive-transition is defined in the protocol specification. If undefined, it is determined as undefined reception. Further, when the send-transition of executable state transition is added, the number of signals in the channel when other processes reach the least states for the state represented by the node of the transition destination is checked. If it exceeds a predetermined channel capacity, it is determined as overflow. Further, after the completion of generation of all state transition graphs, a check is made as to whether or not there is a state transition which is defined in the protocol specification but has never been added to the state transition graph. If such a transition is found, it is determined as unexecutable transition. For example, in the protocol specification of FIG. 2(b), the receive-transition returning from the state SERVICE of process 2 to the same state SERVICE by reception of the signal ACK is detected as an unexecutable transition, since it has never been added to the state transition graph of process 2 in FIG. 9(b).

(6) On the other hand, after the completion of generation of the state transition graph of each process, if, among the stable state set generated up to the moment, a stable state in which no process state that has send-transition is found, it is detected as a deadlock. In the example shown in FIG. 9, the stable state (WAIT. 2, FAULT. 2) is detected as a deadlock.

Problems of the Second Conventional Method

The second conventional method generates a state transition graph of each process, rather than that of the entire system. Therefore, the problems of the first conventional method which enumerates all of the reachable system states can be greatly reduced. However, since all stable states are generated to detect a deadlock, a memory having a large capacity is still required for the generation of stable states for a large-scale or complicated protocol specification, and a very long processing time is required.

A primary object of the present invention is to provide a validation method of a protocol which is able to eliminate the above-described problems of conventional methods.

SUMMARY OF THE INVENTION

In a first embodiment of the present invention which attains the above object, there is provided a validation method of a protocol which, using a protocol specification represented by signals as an input, checks behavior of the protocol according to transition information in the protocol specification to detect protocol errors contained in the protocol specification, comprising:

(1) a first processing step wherein a state transition graph of each process comprising only executable state transitions of each process is generated according to the transition information of the input protocol specification and, simultaneously, protocol errors related to behavior of each process is detected; and (2) a second processing step wherein reachable system states among system states defined by combinations of individual process states and individual channel states are successively generated according to the transition information of the generated state transition graph of each process and, among the generated reachable system states, a system state which cannot further transit is detected as deadlock.

A second embodiment of the present invention, in addition to the first embodiment of the validation method of a protocol, is characterized in that:

(1) in the first processing step, in the generation of the state transition graph of each process, a received state which is a state to which the receiving process transits by receiving a signal for each send-transition is determined, and information thereof is held; and (2) in the second processing step, in the generation of the reachable system state, using the information of the received state held in the first processing step, a system state after receiving the signal is generated from the system state where the signal still exists in a channel.

A third embodiment of the present invention, in addition to the first or second embodiments of the validation method of a protocol, is characterized in that:

(1) in the second processing step, in the generation of the reachable system states, when a next system state is generated from a system state including a plurality of unreceived signals in a channel, the last transmitted signal is selected from the plurality of unreceived signals, and the system state after reception of the selected signal is generated as a next system state.

A fourth embodiment of the present invention, in addition to any one of the first to third embodiments of the validation method of a protocol, is characterized in that:

(1) in the second processing step, in the generation of the reachable system states, when a next system state is generated by executing a send-transition of a process from a system state where the channel is empty, and one or more send-transitions successively exist following the send-transition, the process is advanced to a state of a destination reached by executing the first send-transition and successive send-transitions to produce a next system state.

A fifth embodiment of the present invention, in addition to any one of the first to fourth embodiments of the validation method of a protocol, is characterized in that:

(1) in the second processing step, in the generation of the reachable system state, when a next system state is generated from a system state including an unreceived signal in a channel, and when a process which has to receive the signal has one or more successive send-transitions at the state after the signal is received, the process is advanced to the state after a series of send-transitions following reception of the signal are all executed to generate a next system state.

A sixth embodiment of the present invention, in addition to any one of the first to fifth embodiments of the validation method of a protocol, is characterized in that:

(1) in the first processing step, in the generation of the state transition graph of each process, every time a node is added, a state that each of other processes should at least have reached for the process to reach the state represented by the node is determined as a least state, and the information thereof is held; and (2) in the second processing step, in the generation of the reachable system state, when a next system state is generated from a system state including an unreceived signal in a channel, using the least state information held in the first processing step, if the least state of each of other processes for the state of the transition destination of the receiving process is ahead of the state constituting the system state of the generation source, the state of the other process is advanced to the least state to generate a next system state.

A seventh embodiment of the present invention, in addition to any one of the first to sixth embodiments of the validation method of a protocol, is characterized in that:

(1) in the first processing step, in the generation of the state transition graph of each process, when two states in a process are equivalent in the sense that transition sequences following the individual states are identical, generation of the state transition graph thereafter and detection of protocol errors are stopped for the later generated state as an equivalence stop state, and information of the equivalence stop state is held; and (2) in the second processing step, in the generation of the reachable system state, using the information of equivalence stop states held in the first processing step, when an equivalence stop state is included in a system state, generation of system state to be next generated from that system state is stopped.

An eighth embodiment of the present invention, in addition to any one of the first to sixth embodiments of the logical validation method of a protocol, is characterized in that:

(1) in the first processing step, in the generation of the state transition graph of each process, when two states in a process are equivalent in the sense that transition sequences following the individual states are identical, generation of the state transition graph thereafter and detection of protocol errors are stopped as an equivalence stop state for the later generated state, and information of the equivalence stop state is held; and (2) in the second processing step, in the generation of the reachable system state, using the information of the equivalence stop state held in the first processing step, when an equivalence stop state is included in any process between a system state and the system state to be next generated from that system state, generation of the system state to be next generated is stopped.

A ninth embodiment of the present invention, in addition to any one of the first to eighth embodiments of the validation method of a protocol, is characterized in that:

(1) in the second processing step, in the generation of the reachable system state, when a system state reached by a transition sequence beginning with a send-transition from a system state where all channels are empty and a series of subsequent system states are validated, the send-transition is stored as a validation completion transition, and when the send-transition stored as the validation completion transition appears on the way of generation of system states that follows the transition sequence beginning with another send-transition from the above-mentioned system state where all channels are empty, generation of system state that follows the validation completion transition is stopped.

In the present invention, validation processing of a protocol is carried out in two steps: a first processing step for detecting protocol errors related to the behavior of each process, and a second processing step for detecting deadlocks.

In the first processing step, instead of generating reachable system states from the protocol specification as in the first conventional method, a state transition graph of each process comprising only executable state transitions of each process is generated to detect protocol errors such as undefined reception, overflow, and unexecutable transition as in the second conventional method. As a result, even when a large-scale or complicated protocol specification is validated, a large capacity memory for storing all of the generated system states is not required as in the first conventional method, and a time-consuming search processing is not required for checking whether or not it is already generated every time a new system state is generated. The procedure for generating the state transition graph of each process is not limited to that of the second conventional method, but may be a different procedure.

In the second processing step, instead of detecting a deadlock from stable state set after all of the stable states are generated and stored in the second conventional method, every time a reachable system state is generated from the state transition graph of each process, a check is made as to whether or not it is able to transit further to detect a deadlock. Therefore, it is not necessary to store all of the generated system states, and a large capacity memory for storing all of the generated stable states is not required as in the second conventional method even when validating a large-scale or complicated protocol specification.

The deadlock detection in the second processing step of the present invention is similar to the first conventional method in that the reachable system states are checked, but it is substantially different in the following points (A) to (C).

(A) Whereas in the first conventional method the system state is generated directly from the protocol specification, in the present invention, a system state is generated based on the state transition graph of each process comprising only executable state transitions generated in the first processing step. Therefore, it has an advantage that various additional techniques can be applied to perform more efficient generation of the system state compared with the first conventional method.

(B) Whereas in the first conventional method all of the generated system states have to be stored in a memory, since, in the present invention, every time a system state is generated, a check is made as to whether or not it is able to transit further to detect a deadlock, unnecessary system states are not required to be stored in the memory. (C) Since, in the first conventional method, every time a new system state is generated, all system states must be searched to check whether or not the new system state has already appeared, but the present invention does not require such a time-consuming search processing.

ADDITIONAL TECHNIQUES

In addition to the above-described basic validation processing, the following techniques (1) to (8) are provided to achieve faster processing.

Technique (1)

To generate a system state after an unreceived signal is received from a system state including the signal in a channel, basically among the state transitions after the state of the process to receive the unreceived signal in the system state including the unreceived signal in a channel, the receive-transition is found, and the receiving process is advanced to the state of the destination of the receive-transition. However, with an eye on the generation processing of the state transition graph of each process, it can be easily known to which state the receiving process enters when it receives the signal for each send-transition. Therefore, in the second embodiment of the present invention, in the first processing step, in the generation of the state transition graph of each process, received state of the receiving process is beforehand calculated for each send-transition, and held as one of transition information. In correspondence with this, in the second processing step, in the generation of the system states after receiving the signal from the system state including an unreceived signal in a channel, a next system state is generated using the previously known received state for the send-transition of the process which has transmitted the signal. With such a technique, generation of the system state and detection of deadlock are simplified, thereby achieving high-speed processing.

Technique (2)

When a next system state is generated from the system state including an unreceived signal in a channel, basically a system state is generated every time a signal is received. However, in view of the deadlock detection, when a plurality of signals are successively received, no deadlock can be on the way. Therefore, in the third embodiment of the present invention, a last transmitted signal is selected from the plurality of unreceived signals, and only the system state after the signal is received is generated. That is, successive receive-transitions are all executed to generate a system state. Therefore, generation of system states on the way can be omitted, thereby achieving high-speed generation of the system state and deadlock detection.

Technique (3)

In the generation of a system state by executing a send-transition of a process from a system state where all channels are empty, when one or more send-transitions exist in succession in that process immediately after the first transmission, basically a system state is generated every time a send-transition is executed. However, also in this case, in view of the deadlock detection, when a plurality of send-transitions are successively executed, no deadlock can be on the way. Therefore, in the fourth embodiment of the present invention, the process state is advanced to the state of the destination after the first send-transition and a series of send-transitions following it are all executed to generate only the system state including the destination state, but system states on the way are not generated. With such a technique, high speed processing of system state generation and deadlock detection is achieved. However, when there is a branch on the way of successive send-transitions, the state with the branch is selected as the destination, and the processing is not further advanced at a time.

Technique (4)

In the generation of a next system state from a system state including an unreceived signal in a channel, also when one or more send-transitions successively exist from the state after the unreceived signal is received, basically a system state is generated every time a receive-transition or each of the send-transitions following the receive-transition is executed. However, also in this case, in view of deadlock detection, when a series of send-transitions following the reception are successively executed, no deadlock can be on the way. Therefore, in the fifth embodiment of the present invention, the process state is advanced to the state of the destination after the receive-transition and a series of send-transitions following it are all executed to generate only the system state including the destination state, but system states on the way are not generated. With such a technique, high speed processing of system state generation and deadlock detection is achieved. However, when there is a branch on the way of process state transitions, the state with the branch is selected as the destination, and the processing is not further advanced at a time.

Technique (5)

In the generation of a next system state from a system state including an unreceived signal in a channel, whereas the receiving process is advanced to a state where the signal is received or after the following send-transitions are executed, for a process other than the receiving process including a case where the number of processes is 3 or more, basically the states of other process in the next state remain the same as the states in the original system state. However, if the states that other processes should have reached for the receiving process to reach the state where the signal is received are beforehand known, other processes can be all advanced to the beforehand known states to generate the next system state. Therefore, in the sixth embodiment of the present invention, in the first processing step, in the generation of the state transition graph of each process, a state that each of other processes should at least have reached for each process to reach each state is beforehand calculated as a "least state", and held as one of the transition information. In correspondence with this, in the second processing step, in the generation of a next system state from a system state including an unreceived signal in a channel, for each process other than the receiving process, if the least state for the transition destination state of the receiving process is ahead of the process state constituting the original system state, since the process can necessarily advance to the least state, the process is advanced to the least state to generate a next state. With such a technique, high-speed processing of system state generation and deadlock detection is achieved.

Techniques (6) and (7)

In the generation of the state transition graph of each process, between two states of a process, transition sequences following the individual states may be identical, and repetitions of such identical transition sequences are useless, which should preferably be avoided. Therefore, in the seventh and eighth embodiments of the present invention, in the first processing step, in the generation of the state transition graph of each process, when two states in a process are equivalent in the sense that transition sequences following the individual states are identical, for example, generation of the state transition graph after the later generated state is stopped, therefore, detection of protocol errors is stopped. Further, the later generated state is set as an equivalence stop state, which is beforehand held as one of transition information. Further, when an equivalence stop state appears in the generation of the system state in the second processing step, since the deadlock detection processing to the transition sequence including the equivalence stop state is carried out in the transition sequence including the state to which the equivalence stop state is equivalent, processing to the transition sequence including the equivalence stop state is useless and should preferably be omitted. Therefore, in the seventh embodiment of the present invention, in the generation of a next system state, if an equivalence stop state is included in the system state from which a next system state is to be generated, generation of the system state from that system state is stopped (technique (6)). On the other hand, in the eighth embodiment of the present invention, also when an equivalence stop state is included not only in the system state from which a next state is to be generated, but also in a process state between the system state and the system state to be generated, generation of the system state to be next generated is stopped (technique (7)). With these techniques, high-speed generation of the state transition graph is achieved, and the processing of system state generation and deadlock detection is accelerated.

Technique (8)

When a plurality of send-transitions executable in an arbitrary order exist in a system state where all channels are empty, checking all transition sequences in which send-transitions are different only in order is useless and should preferably be avoided, since if one of those transition sequences reaches a deadlock state, all the other transition sequences reach the same deadlock state. Therefore, in the ninth embodiment of the present invention, in the generation of the system state in the second processing step, when a system state reached by a transition sequence beginning with a send-transition from a system state where all channels are empty and a series of system states following it are validated, the send-transition at the beginning of the transition sequence is stored as a "validation completion transition". Then, when a send-transition same as the "validation completion transition" stored on the way of successive generation of system states for a transition sequence beginning with another send-transition from the system state where all channels are empty, further generation of system states that follow the send-transition is stopped. With this technique, processing of the generation of system states and deadlock detection is accelerated.

BRIEF DESCRIPTION OF THE FIGURES

FIG. 3 is a diagram showing an example of storage form of a protocol specification on a memory for the second conventional method;

FIG. 9(a) and FIG. 9(b) are diagrams showing an example of state transition graph of each process generated by the second conventional method.

Description of Symbols

S1: First processing step (process validation)
S2: Second processing step (global validation).

DETAILED DESCRIPTION OF PREFERRED EMBODIMENTS

Figure 1:
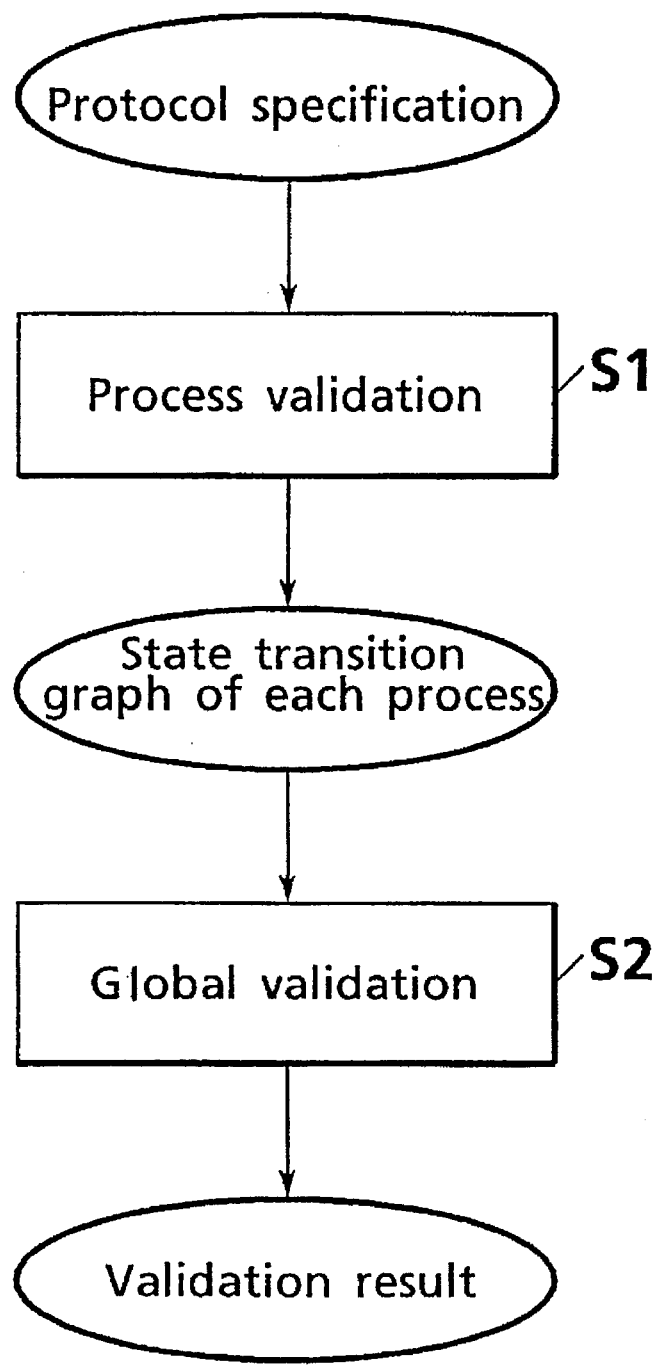
FIG. 1 is a diagram showing processing flow of a basic embodiment of the validation method of a protocol according to the present invention.
Figure 4:
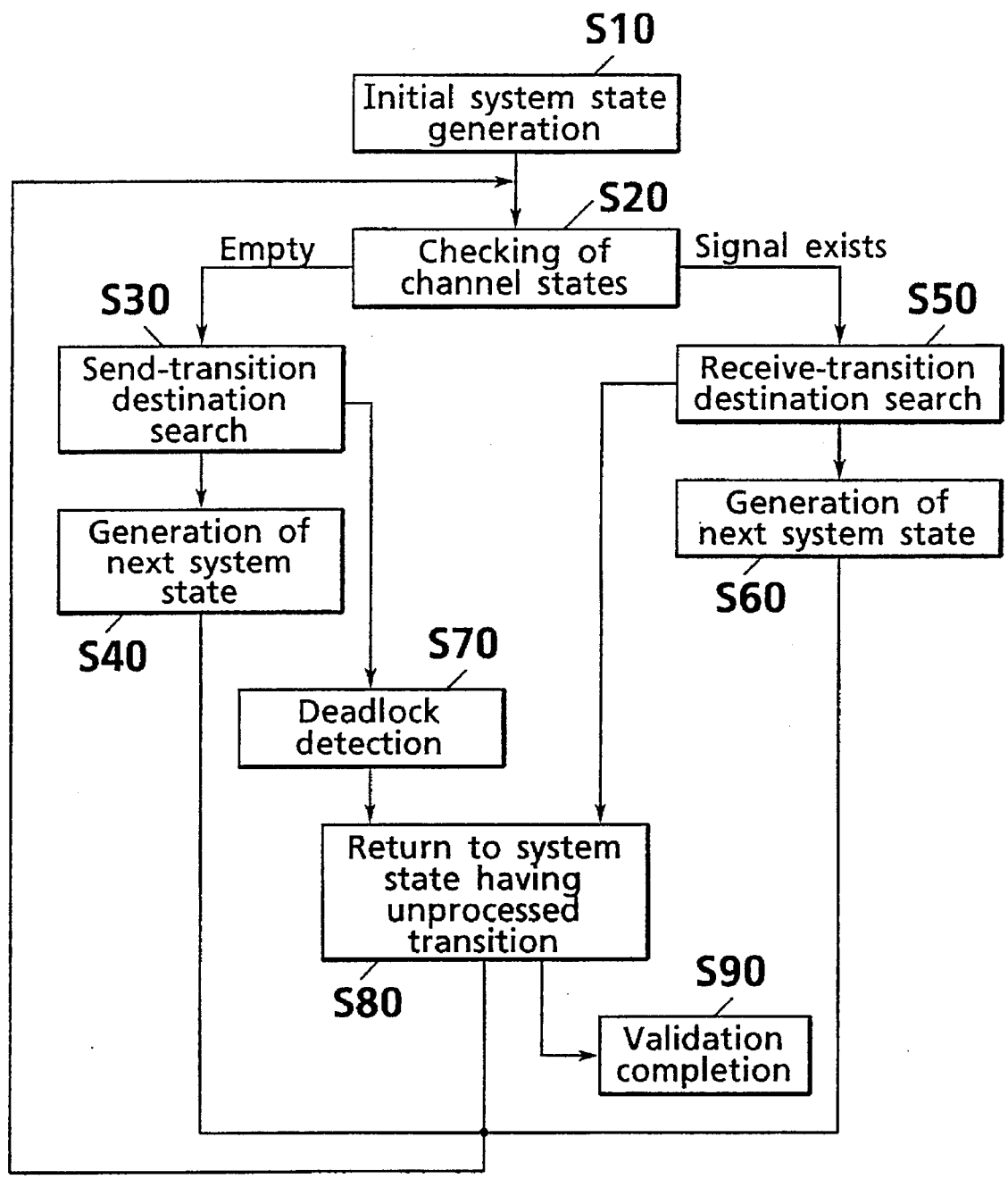
FIG. 4 is a diagram showing processing flow of the second processing step (global validation) of an embodiment of the validation method of a protocol according to the present invention.
Figure 5:
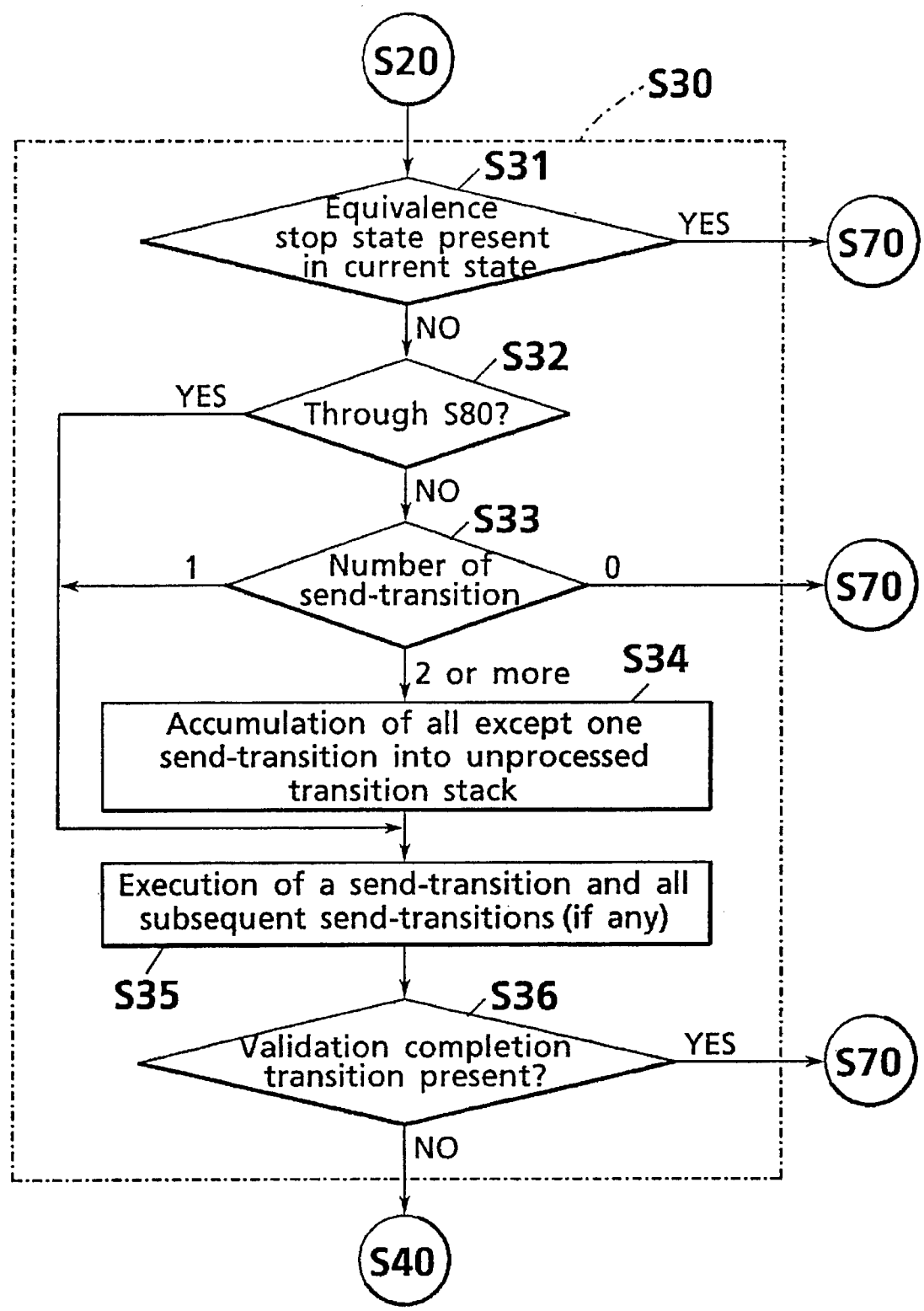
FIG. 5 is a diagram showing detailed processing flow of send-transition destination search (step S30) in FIG. 4.
Figure 6:
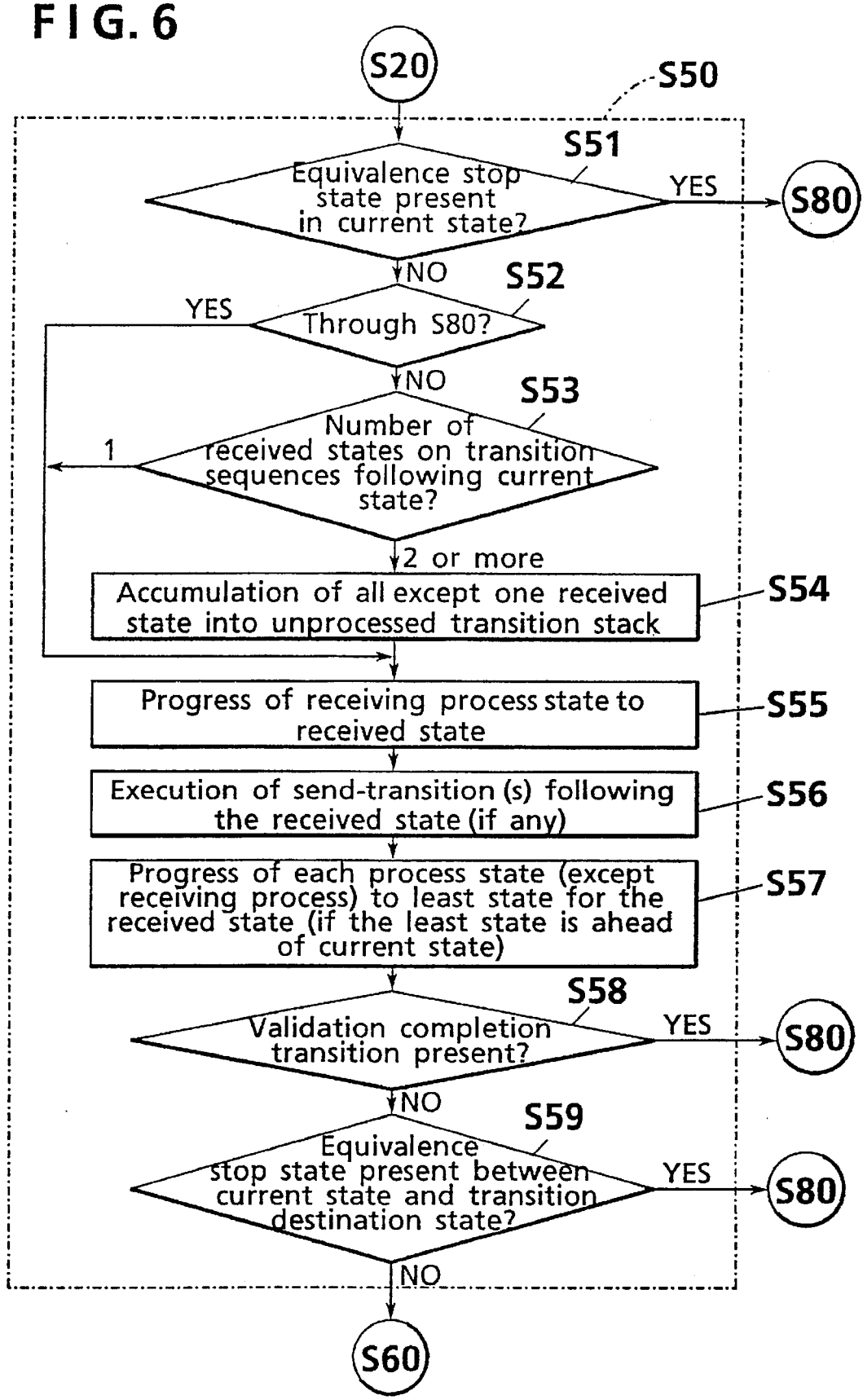
FIG. 6 is a diagram showing detailed processing flow of receive-transition destination search (step S50) in FIG. 4.
Figure 7:
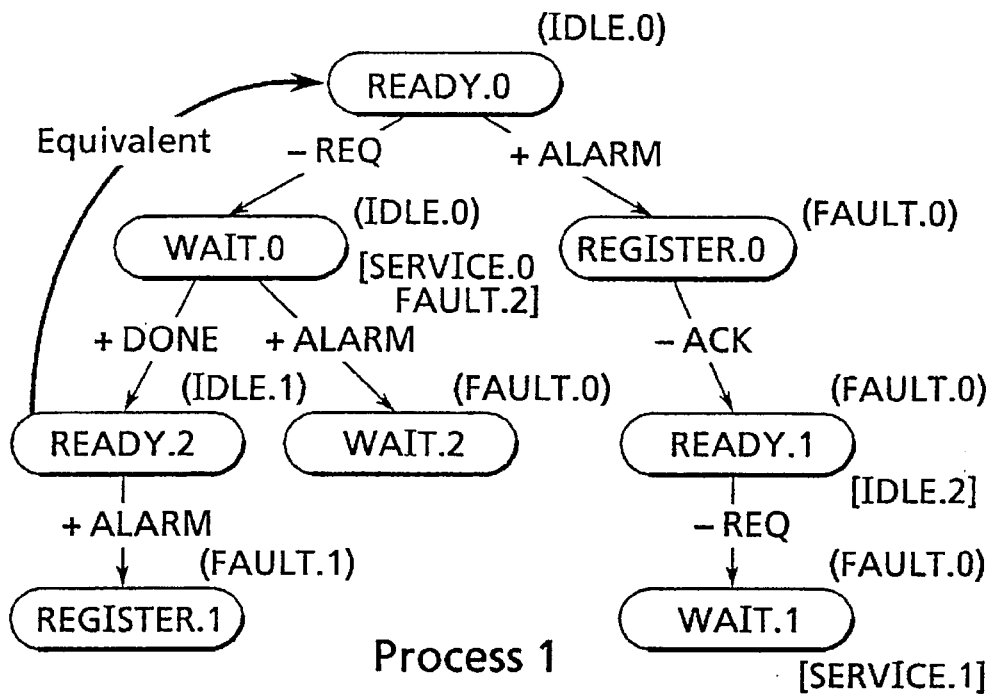
FIG. 7(a) and FIG. 7(b) are diagrams showing an example of state transition graph of each process generated by the first processing step (process validation) of an embodiment of the validation method of a protocol according to the present invention.
Figure 7:
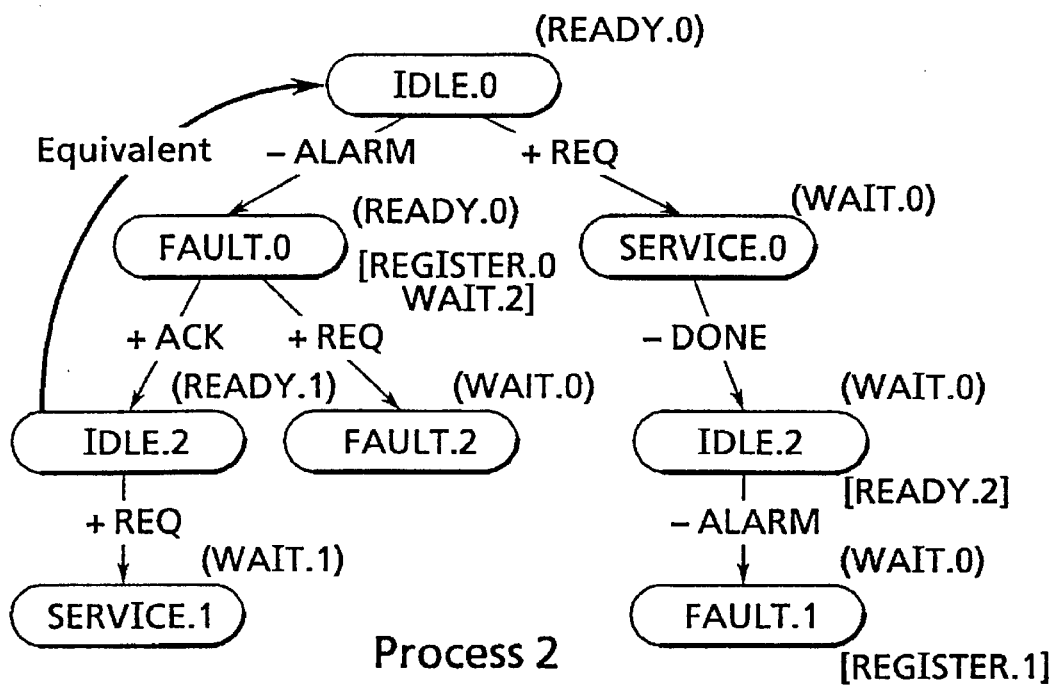
Figure 8:
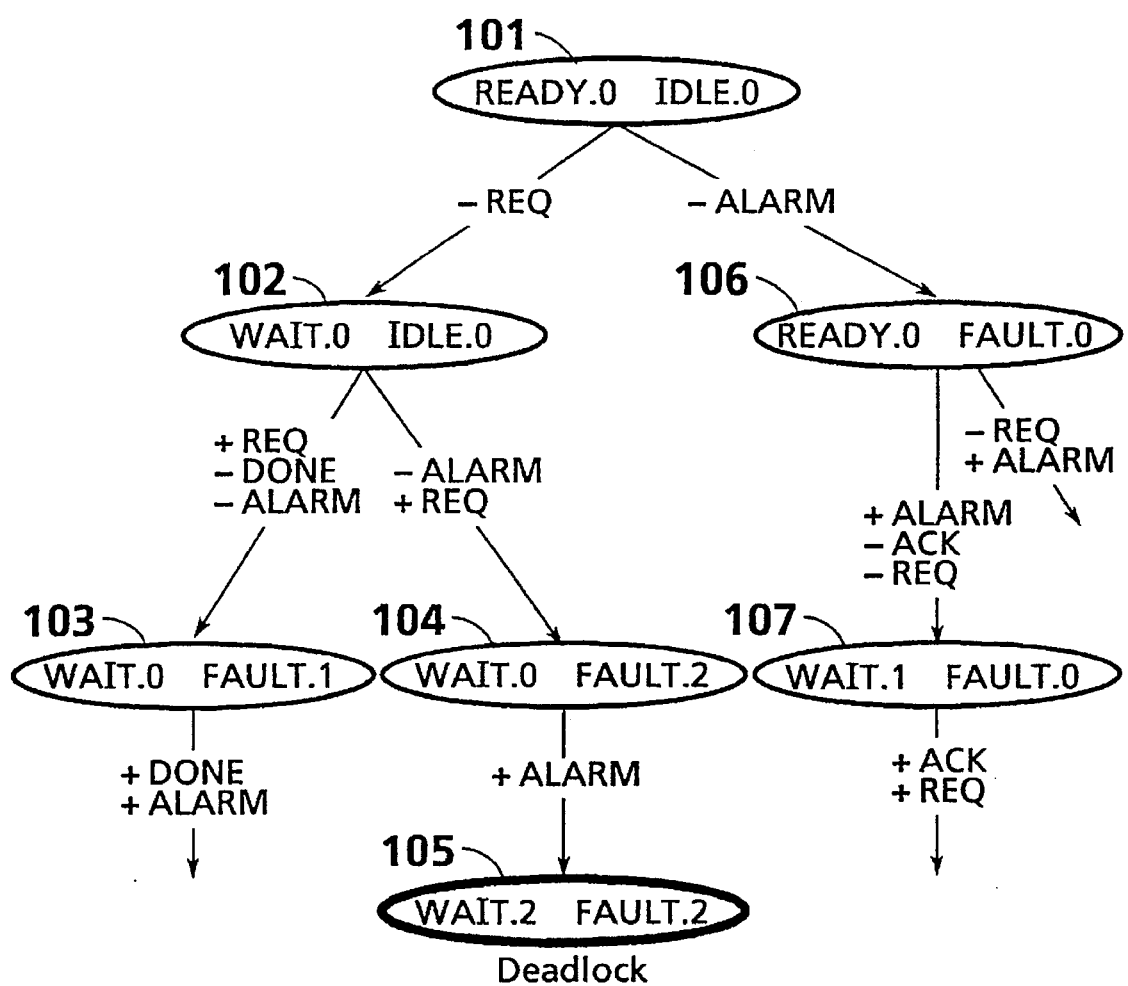
FIG. 8 is a diagram showing a state transition graph of system states generated from the state transition graph of each process in FIG. 7.

The present invention and embodiments thereof will be described with reference to the figures. FIG. 1 shows a processing flow of a basic embodiment of the validation method of a protocol of the present invention. FIGS. 2(a) and 2(b) show a protocol specification of a validation example, and FIG. 3 shows a storage form in a memory of a protocol specification example to be validated. FIG. 4 shows processing flow of the second processing step of an embodiment of the validation method of a protocol of the present invention, FIG. 5 shows details of a part related to send-transition destination search of the processing flow, FIG. 6 shows details of a part related to receive-transition destination search of the processing flow, FIG. 7 shows a state transition graph of each process generated from the protocol specification in FIGS. 2(a) and 2(b), and FIG. 8 shows a transition graph of system states generated from the state transition graph of each process.

Basic Embodiment

Figure 2:
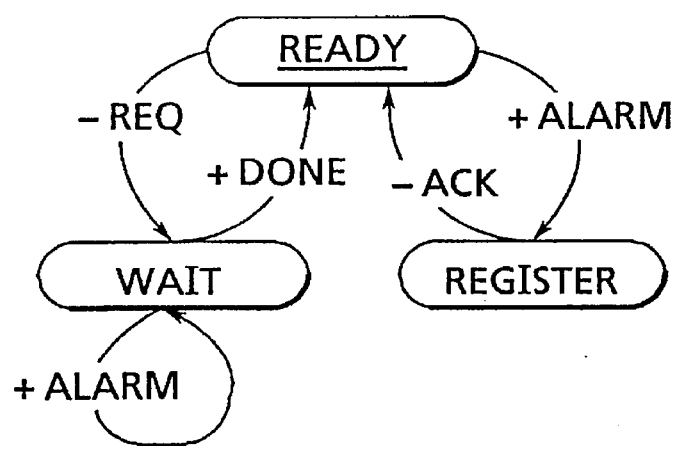
FIG. 2(a) and FIG. 2(b) are diagrams showing a protocol specification of a validation example generated by the second conventional method.
Figure 2:
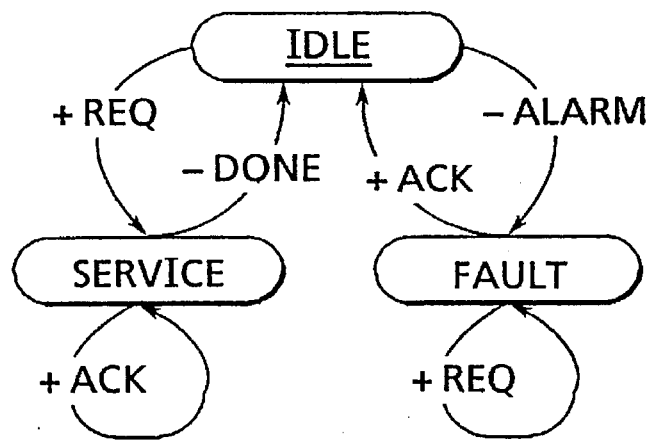

First, the basic embodiment of the present invention will be described with reference to FIGS. 1 to 3. In this case, the protocol specification to be validated comprises two processes, process 1 and process 2, and it is represented by electrical signals as shown in FIG. 3. In FIG. 1, a rectangle shows each processing, an oval shows input/output of each processing, and an arrow indicates data flow.

As shown in FIG. 1, basically the validation method of a protocol of the present invention uses two steps, the first processing step and the second processing step, to detect protocol errors. In the following description, the first processing step is referred to as process validation. In process validation S1 of this example, when the protocol specification shown in FIG. 3 is input, a state transition graph of each process comprising only executable state transitions of each process is generated according to the transition information that the protocol specification has and, at the same time, protocol errors other than deadlock is detected as protocol errors related to the behavior of each process. Further, in the following description, the second processing step S2 is referred to as global validation. In the global validation S2, reachable system states are successively generated according to the transition information that the state transition graph of each process has to detect a system state which cannot further transit as a deadlock.

Next, a basic example of procedure for generating a state transition graph of each process comprising only executable state transitions of each process from the protocol specification shown in FIGS. 2(a) and 2(b) will be described. Although partly overlapping with the above description of the second conventional method, in the protocol specification example shown in FIGS. 2(a) and 2(b), an oval indicates each state of individual processes 1 and 2, and a state name (READY, WAIT, REGISTER, IDLE, SERVICE, FAULT) is shown in the oval. An underlined state name (READY, IDLE) indicates an initial state. An arrow connecting ovals indicates a state transition, and the signal name (REQ, ACK, DONE, ALARM) transmitted or received during the state transition is shown on the arrow, with "−" for transmission, or "+" for reception. Therefore, in the protocol specification shown in FIGS. 2(a) and 2(b), for example, process 1 is specified such that it transmits the signal REQ from the initial state READY to process 2 to transit to the state WAIT, or that it receives the signal ALARM from process 2 before transmission of the signal REQ to transit to the state REG- ISTER. Of the signal names, REQ denotes a transmission request signal, ACK denotes an affirmative reception response signal, DONE denotes a job completion notification signal, and ALARM denotes an abnormality alarm signal. In the storage form example of protocol specification shown in FIG. 3, all sets of the process state name and all state transitions from the state are shown. Each state transition has the signal name with identification mark of transmission or reception in parentheses, followed by the state name of the transition destination.

(1) To generate the state transition graph of each process, first an initial node representing the initial state is generated for each process.

(2) Then, addition of executable send-transition and addition of executable receive-transition are repeated to generate the state transition graph of each process.

(3) By generating the above state transition graph of each process, protocol errors related to the behavior of each process is detected. That is, in the generation of the state transition graph of a process, when a receive-transition is added, a check is made as to whether or not the receive-transition is defined in the protocol specification. If not defined, it is determined as an undefined reception. Further, in the addition of send-transition, the number of signals in the channel is checked and, if it exceeds a predetermined channel capacity, it is determined as overflow. Further, after the completion of generation of all state transition graphs, if there is a state transition which is defined in the protocol specification but has never been added to the state transition graph, the unadded one is determined as unexecutable transition. For example, in the protocol specification of FIG. 2(b), the receive-transition returning from the state SERVICE of process 2 to the same state SERVICE by reception of the signal ACK is detected as an unexecutable transition, since it has never been added to the state transition graph of process 2 in FIG. 9(b).

Practical Embodiment

A more practical embodiment of the present invention will be described with reference to FIGS. 2(a) and 2(b) to 8. Also in the present embodiment, validation is described for the protocol specification with two processes shown in FIGS. 2(a) and 2(b).

First Processing Step: Example of Process Validation

In the first processing step, that is, the process validation, in addition to the above-described basic generation of the state transition graph of each process and detection of protocol errors other than deadlock, the following processing (A) to (C) are performed for high-speed processing.

(A) In the generation of the state transition graph of each process, for each send-transition, the received state which the receiving process enters by receiving the transmitted signal is calculated, and held as transition information.

(B) In the generation of the state transition graph of each process, a state that should have been reached for each process to reach each later state is calculated as a least state, and also held as transition information.

(C) In the generation of the state transition graph of each process, when two states in a process are equivalent in the sense that transition sequences following the individual states of the two states are identical, generation of the state transition graph and detection of protocol errors are stopped for the later state as an equivalence stop state, and the equivalence stop state is also held as transition information.

Generation of State Transition Graph of each Process

Next, an example will be described in which the state transition graph of each process as shown in FIGS. 7(a) and 7(b) is generated by process validation processing including (A) to (C) above from the protocol specification shown in FIGS. 2(a) and 2(b) represented by electrical signals as shown in FIG. 3. The state transition graphs of processes 1 and 2 shown in FIGS. 7(a) and 7(b) comprise nodes and arrows, an oval node indicates a process state, and an arrow connecting nodes indicates an executable state transition. The state name of the node is provided with a period "." and a number. This number is an identifier for distinguishing states of the same name reached by different transition sequences. As in the protocol specification in FIGS. 2(a) and 2(b), a transmitted or received signal name, which is executed in association with state transition, is provided on the arrow. Among the nodes, at the right below of each node after send-transition, a received state name of the receiving process for the send-transition with the identifier thereof are shown in parentheses []. For example, for the send-transition from state READY. 0 of process 1 to state WAIT. 0, since the received state of process 2 to receive the transmitted signal REQ is SERVICE. 0 or FAULT. 0, [SERVICE. 0, FAULT. 2] is shown at the right below the node representing state WAIT. 0. Further, at the right above of each node, the least state name of each of other processes for the state of the process represented by the node is shown with an identifier in parentheses (). For example, in FIG. 7(b), FAULT. 0 is written as the least state of process 2 for state WAIT. 2 of process 1. This means that, for process 1 to reach state WAIT. 2, process 2 is required at least to have transmitted signal ALARM and have reached FAULT. 0. Since, in the example in FIG. 7(b), the number of processes of the system is 2, the least state is only the state of the partner's process.

(1) First, an initial node representing the initial state is generated for each process, and the initial state of each of other processes is set to the initial node of each process as a least state of each of other processes for the individual initial states. For example, for process 2, when the initial node representing the initial state IDLE. 0 is generated in FIG. 7(b), initial state READY. 0 of process 1 is set to the initial node of process 2 as the least state of process 1 for the initial state IDLE. 0 of process 2.

(2) Then, addition of executable send-transition and addition of executable receive-transition are repeated to generate the state transition graph of each process.

(3) During the generation of the state transition graph of each process, every time a new node is generated by executable receive-transition, the new node is set as a received state to the node representing the state after transmission of the received signal. For example, in process 2 in FIG. 7(b), to the node representing state FAULT. 0 after transmission of signal ALARM from state IDLE. 0, the received state is added every time the node representing states REGISTER. 0 and WAIT. 0 after the signal is received is successively generated, and the final received state is [REGISTER. 0, WAIT. 21.

(4) On the other hand, in the generation of the state transition graph of each process, every time a new node is generated by the addition of a new executable state transition, a least state of each of other processes for the 35 state represented by the node is set to the node. For process 2, for example, when a node representing state SERVICE. 0 is generated by adding the receive transition of signal REQ to the initial node in FIG. 7(b), the least state WAIT. 0 for the state SERVICE. 0 is set.

(5) Further, during the generation of the state transition graph of each process, when two nodes in a process conform to all of the following conditions A, B, and C, since state transitions that can occur from these two nodes are identical, that is, since the states represented by these two nodes are equivalent in the sense that individual subsequent transition sequences are identical, for example, the later generated state is stored as equivalence stop state, and addition of send-transitions thereafter is stopped so that generation thereafter of the state transition graph and detection of protocol errors related to behavior of the process is stopped.

Condition A: state names represented by the nodes are the same except for the identifiers.

Condition B: least states set to the nodes are the same except for the identifiers.

Condition C: channel states in the system state comprising states represented by the nodes and the least states set to the nodes are the same.

As described above, the state where addition of send-transitions thereafter is stopped because of the equivalence of states is "equivalence stop state". For example, in process 1 of FIG. 7(a), state READY. 2 is equivalent to state READY. 0, and is thus an equivalence stop state. However, since states WAIT. 1 and WAIT. 2 differ in channel state, they are not equivalent. On the other hand, in process 2, since state IDLE. 2 is equivalent to IDLE. 0, this is an equivalence stop state.

(6) By generating the state transition graph of each process as described above, protocol errors related to the behavior of each process are detected. That is, in the generation of the state transition graph of a process, when a receive-transition of executable state transitions is added, a check is made as to whether or not the receive-transition is defined in the protocol specification. If not defined, it is determined as an undefined reception. Further, when a send-transition of executable state transitions is added, the number of signals in the channel when other processes reach the least states of those processes for the node of the destination is checked and, if it exceeds a predetermined channel capacity, it is determined as overflow. Further, after the completion of generation of all state transition graphs, a check is made as to whether or not there is a state transition which is defined in the protocol specification but has never been added to the state transition graph. If such a transition is found, it is determined as unexecutable transition. For example, in the protocol specification of FIG. 2(b), the receive-transition returning from the state SERVICE of process 2 to the same state SERVICE by reception of the signal ACK is detected as an unexecutable transition, since it has never been added to the state transition graph of process 2 in FIG. 9(b).

Second Processing Step: Practical Example of Global Validation

In the second processing step, that is, in the global validation, to accelerate the above-described basic deadlock detection by the generation of the system states, system states are successively generated by the procedures shown in FIGS. 4 to 6. However, in FIGS. 4 to 6, a rectangle indicates a processing step, and an arrow indicates a processing flow. The "current state", "unprocessed transition", and if unprocessed transition stack" respectively mean as follows.

(A) Current state: in the global validation, reachable system states are successively generated such that a system state reachable from a system state is generated, and further a next reachable system state is generated from the generated system state. Then, when a system state and subsequent transitions are checked at present to generate a next reachable system state, the current system state under checking is referred to as "current state"

(B) Unprocessed transition: when in a system state, there are a plurality of subsequent transitions to be checked, a transition which is yet unprocessed is referred to as it unprocessed transition". Unprocessed transition includes an "unprocessed send-transition" which transits by transmission of a signal, and an "unprocessed received state" to which the receiving process transits by reception of a signal.

(C) Unprocessed transition stack: as a technique to process individual unprocessed transitions, each of unprocessed transitions is combined with the related current state and all of the combinations are stored in a stack. Then, a stack used in such a method is referred to as unprocessed transition stack"

(1) Referring to FIG. 4, in step S10, from the transition information of state transition graph of each process, all initial states of individual processes are combined to generate an initial system state, which is stored in a memory.

(2) In step S20, channel states of the current state are checked and, as a result, when there is no signal which is transmitted and unreceived in any channel, the processing proceeds to step S30 (send-transition destination search), or when there is a signal which is transmitted and unreceived in a channel, the processing proceeds to step S50 (receive-transition destination search).

(3) In step S30, by the procedure (steps S31–S36) of which details are shown in FIG. 5, a send-transition destination is searched for using the transition information of state transition graph of each process, and a determination is made as to which the processing proceeds to among step S40 (generation of next system state), step S70 (deadlock detection), and step S80 (return to system state having unprocessed transition) in FIG. 4. These steps S40, S70, and S80 will be described later.

(3-1) In step S31 of FIG. 5, a check is made as to whether or not an equivalence stop state is included in the current state. If included, since the transition sequence after the current state can be checked in the transition sequence including another state which is equivalent to the equivalence stop state, generation of the system states after the current state is stopped, and the processing proceeds to step S80 through step S70 of FIG. 4 to check other transition sequences. If an equivalence stop state is not included in the current state, the processing proceeds to next step S32 of FIG. 5.

(3-2) In step S32, a check is made as to whether or not the processing has proceeded to step S20 and step S30 through step S80 of FIG. 4. If through S80, since the transition destination of an unprocessed transmission transition taken out from the unprocessed transition stack in S80 as will be described later is to be searched, the processing proceeds to step S35 (execution of send-transition(s)) of FIG. 5. If not through S80, in order to search the transition destination of send-transition which the current state has, the processing proceeds to step S33 (checking of the number of send-transitions).

(3-3) In step S33, the number of send-transitions of the current state is checked and, when there are a plurality of transitions, the processing proceeds to step S34 (accumulation of unprocessed send-transitions), or when there is a single transition, the processing proceeds to step S35. When the number of send-transitions of the current state is zero, the processing proceeds to step S70 of FIG. 4.

(3-4) In step S34, an arbitrary one is selected from a plurality of send-transitions of the current state, the remnants are combined with their current state and accumulated individually in the unprocessed transition stack, and the processing proceeds to step S35.

(3-5) In step S35, a check is made as to whether or not one or more send-transitions are present following the send-transition. When not present, the send-transition, as is, is executed, and the processing proceeds to step S36 (checking of validation completion transition), or when present, all the successive send-transitions are also executed, and then the processing proceeds to step S36. However, when the transition has a branch on the way, the state as the branch is the transition destination.

(3-6) In step S36, a check is made as to whether or not a send-transition stored as validation completion transition appears between the current state and the system state of the transition destination by the execution of send-transitions in step S35 and, if so, the processing proceeds to step S70 of FIG. 4. If no validation completion the current state is checked and, when there are a plurality of transitions, the processing proceeds to step S34 (accumulation of unprocessed send-transitions), or when there is a single transition, the processing proceeds to step S35. When the number of send-transitions of the current state is zero, the processing proceeds to step S70 of FIG. 4.

(3-4) In step S34, an arbitrary one is selected from a plurality of send-transitions of the current state, the remnants are combined with their current state and accumulated individually in the unprocessed transition stack, and the processing proceeds to step S35.

(3-5) In step S35, a check is made as to whether or not one or more send-transitions are present following the send-transition. When not present, the send-transition, as is, is executed, and the processing proceeds to step S36 (checking of validation completion transition), or when present, all the successive send-transitions are also executed, and then the processing proceeds to next step S36. However, when the transition has a branch on the way, the state as the branch is the transition destination.

(3-6) In step S36, a check is made as to whether or not a send-transition stored as validation completion transition appears between the current state and the system state of the transition destination by the execution of send-transitions in step S35 and, if so, the processing proceeds to step S70 of FIG. 4. If no validation completion transition appears, the processing proceeds to step S40 (generation of next system state) to generate a next system state.

(4) In step S40 of FIG. 4, a system state reached by execution of the send-transitions found in above step S30 is generated, which is stored as a new current state in the memory, the former current state is erased from the memory, and the processing returns to step S20 (checking of channel states).

(5) In step S50 of FIG. 4, by the procedure (S51–S59) of which details are shown in FIG. 6, the received state of the unreceived signal is searched using transition information which the state transition graph of each process has, and a determination is made as to which step the processing proceeds to among step S60 (generation of next system state) and step S80 (return to system state having unprocessed transition). The individual steps S60 and S80 will be described later.

(5-1) In step S51 of FIG. 6, a check is made as to whether or not an equivalence stop state is included in the current state. If included, since transition sequence after the current state can be checked in the transition sequence including another state which is equivalent to the equivalence stop state, generation of system states is stopped, and the processing proceeds to step S80 in order to check other transition sequences. If no equivalence stop state is included in the current state, the processing proceeds to step S52 of FIG. 6.

(5-2) In step S52, a check is made as to whether or not the processing has proceeded to step S20 and step S50 through step S80 of FIG. 4. If through step S80, since processing is to be done for an unprocessed received state taken out from the unprocessed transition stack in step S80 as will be described, the processing proceeds to step S55 (progress of receiving process state to received state). If not through step S80, in order to find transition destination of receive-transition for the generation of next system state from the current State, the processing proceeds to next step S53 (checking of number of received states on the transition sequences following current state).

(5-3) In step S53, an arbitrary channel is selected from channels including signals, and the number of received states on the transition sequence that follows the current state among the received states for the last signal in the selected channel is checked. When there are a plurality of received states, the processing proceeds to next step S54 (accumulation of unprocessed received states). When there is one received state, the processing proceeds to step S55. In this case, the reason why processing is performed on the last signal in the channel is that, when a plurality of signals are included in one channel, the receiving process can be advanced to the received state for the last signal instead of executing the receive-transitions one by one because a deadlock will never occur on the way of successive reception of signals.

(5-4) In step S54, an arbitrary one is selected from a plurality of received states on the transition sequence that follows the current state, the remnants are combined with the current state and individually accumulated in the unprocessed transition stack, and the processing proceeds to step S55. A received state which is not on the transition sequence which includes the current state in the state transition graph of each process is not accumulated in the unprocessed transition stack.

(5-5) In step S-05, the receiving process is advanced to the received state, and then the processing proceeds to step S56 (execution of send-transition(s) following the received state).

(5-6) In step S56, a check is made as to whether or not there exist one or more send-transitions that follow the received state. If not, the processing proceeds to step S57 (progress of each process state to least state for the received state). If so, the states of the destination reached by executing also the successive send-transitions are set as the transition destination state of the receiving process, and the processing proceeds to step S57. However, when there is a branch on the way, the state as that branch is the transition destination.

(5-7) In step S57, for each process except the receiving process, when the least state for the transition destination state of the receiving process is ahead of the state in the current state, it is advanced to that least state, and the processing proceeds to step S58 (checking of validation completion transition.

(5-8) In step S58, a check is made as to whether or not a send-transition stored as validation completion transition appears between the current state and the system state of its transition destination by execution of the state transitions in steps up to S57. If not, the processing proceeds to step S59 (checking of equivalence stop state). If a validation completion transition appears, the processing proceeds to step S80 of FIG. 4.

(5-9) In step S59, a checking is made as to whether or not the equivalence stop state is included in any process states between the current state and the system state of the transition destination. If included, the processing proceeds to step S80 of FIG. 4. If not included, the processing proceeds to step S60 of FIG. 4.

(6) In step S60 of FIG. 4, a system state reached by executing the receive-transition found in step S50 is generated, which is stored as a new current state in the memory, the original current state is erased from the memory because it is no longer necessary, and the processing returns to step S20 (checking of channel states).

(7) In step S70, deadlock detection processing is performed, and then the processing proceeds to step S80. For example, when the number of send-transitions is found to be zero in the checking of the number of send-transitions in step S30 (S33), since the system state cannot transit further than the current state, the current state is detected as deadlock and stored in the memory, and the processing proceeds to step S80.

(8) In step S80, since it is no longer necessary to generate the next system state from the current state, after the current state is erased from the memory, an unprocessed transition and a system state having it are taken out from the unprocessed transition stack, the system state is stored as a new current state in the memory, and then the processing returns to the channel state check of step S20. If the unprocessed transition stack is empty, generation of system states is completed, and the processing proceeds to step S90.

(9) In step S90, the entire global validation processing, that is, generation of reachable system states based on the state transition graph of each process comprising only executable state transitions of the process and deadlock detection, is completed.

Practical Embodiment of System State Generation

Next, generation of system states by the processing in FIGS. 4 to 6 using the state transition graph of each process shown in FIGS. 7(a) and 7(b) as an input will be described with reference to FIG. 8. In the following description, the system state is represented in the form of (state of process 1, state of process 2) by omitting channel states. Even with such an omission, there is no problem of misunderstanding since the identifier is used in the state name.

(A) First, by the processing of step S10, an initial system state 101 (READY. 0, IDLE. 0) is generated by the combination of the initial state of process I (READY. 0) and the initial state of process 2 (IDLE. 0), which is stored as the current state in the memory.

(B) Since, in the initial system state 101, all channels are empty, the processing proceeds from step S20 to step S30, where a send-transition from the initial system state 101 is searched for. In this case, an assumption is made that send-transitions are found in the order of send-transition -REQ of process 1, send-transition -ALARM of process 2. Therefore, by the processing in step S33 and step S34, the current state (READY. 0, IDLE. 0) and the unprocessed send-transition -ALARM are accumulated in the unprocessed transition stack, and send-transition of -REQ is first processed. The send-transition -REQ with the name of the states before and after the transition including the identifiers is stored as validation completion transition, which is held until the completion of validation processing of all system states in the transition sequences that follow the system state 101.

(C) Then, by the processing in step S40, a system state 102 (WAIT. 0, IDLE. 0) after process 1 executes the send-transition -REQ is generated, which is stored as a new current state in the memory, after the original current state 101 (READY. 0, IDLE. 0) is erased from the memory, the processing returns to the step S20.

(D) In the current state 102 (WAIT. 0, IDLE. 0), since the signal REQ remains in a channel, it is determined in step S20 that there is an unreceived signal, and received state for the unreceived signal REQ is searched for in step S50. It has already been found out in the process validation that there are two received states SERVICE. 0 and FAULT. 2 for the send-transition -REQ. In this case, an assumption is made that the two are found in the order of SERVICE. 0, FAULT. 2 as described in FIGS. 7(a) and 7(b). Therefore, by the processing in step S53 and step S54, the current state 102 (WAIT. 0, IDLE. 0) and the unprocessed received state FAULT. 2 are accumulated in the unprocessed transition stack, and the received state SERVICE. 0 is first processed. As the processing to the received state SERVICE. 0, by the processing in step S56, the process 2 is advanced to the state FAULT. I after the execution of subsequent two send-transitions -DONE and -ALARM.

(E) In step S60, a system state 103 (WAIT. 0, FAULT. 1) including the state (FAULT. 1) of process 2 is generated, which is stored as a new current state in the memory, the original current state 102 (WAIT. 0, IDLE. 0) is erased from the memory, and the processing returns to step S20.

(F) In step S20, since it is known that two unreceived signals DONE and ALARM are present by checking the channel states of the current state 103 (WAIT. 0, FAULT. 1), the processing proceeds to step S50.

(G) In step S50, the reception process 1 is advanced to the received state for the last signal ALARM by the processing in steps S53 to S55 to the two unreceived signals DONE and ALARM. The received state of the process I for the send-transition -ALARM has already been found out to be REGISTER. I by the process validation processing.

(H) However, it has already been found out in the process validation processing that an equivalence stop state READY. 2 equivalent to the initial state READY. 0 exists on the way process 1 transits from the state WAIT. 0 in the current state 103 (WAIT. 0, FAULT. 1) to the received state REGISTER. 1. Further, there is no other receive-transition in the current state 103. Then, the processing proceeds to step S80 by the processing in step S59, and the validation for the transition sequences that follow READY is stopped since it is a repetition of the transition sequences that follow READY. 0, and the processing transfers to validation of other transition sequences. In FIG. 8, the arrow from the system state 103 indicates a transition sequence of which validation is stopped.

(I) In step S80, after the current state 103 (WAIT. 0, FAULT. 1) is erased from the memory, the system state 102 is restored by taking out the unprocessed received state FAULT. 2 from the unprocessed transition stack and the system state (WAIT. 0, IDLE. 0) stored therewith, which is stored as a new current state in the memory, and the processing returns to step S20.

(J) In step S20, since it is known that there is an unreceived signal REQ by checking the channel states of the current state 102 (WAIT. 0, IDLE. 0), the processing proceeds to step S50.

(K) In step S50, unprocessed received state after the current state 102 is searched for. However, it has already been found out to be FAULT. 2 taken out from the unprocessed transition stack. Therefore, the receiving process 2 is advanced to FAULT. 2 by the processing in step S55, and the processing proceeds to next step S60.

(L) In step S60, a system state 104 (WAIT. 0, FAULT. 2) including the state FAULT. 2 of the process 2 is generated, which is stored as a new current state in the memory, the original current state 102 is erased from the memory, and the processing returns to step S20.

(M) In step S20, since it is known that there is an unreceived signal ALARM by checking the channel states of the current state 104 (WAIT. 0, FAULT. 2), the processing proceeds to step S50.

(N) In step S50, a received state for the signal ALARM is searched for. In this case, it has already been found out in the generation of the state transition graph of each process in the process validation that REGISTER. 0 and WAIT. 2 are the received states of the receiving process 1 for send-transition -ALARM. However, no transition is possible from the current state 104 to the received state REGISTER. 0 which is not present on the same transition sequence as the current state 104 is. Therefore, only WAIT. 2 is regarded as the received state of the receiving process 1, the process I is advanced to WAIT. 2 by the processing in step S55, and the processing proceeds to step S60.

(O) In step S60, a system state 105 (WAIT. 2, FAULT. 2) including the state WAIT. 2 of the process 1 is generated, which is stored as a current state in the memory, the original current state 104 is erased from the memory, and the processing returns to step S20.

(P) Since, by checking the channel states of the current state 105 (WAIT. 2, FAULT. 2) in step S20, all channels are found to be empty, the processing proceeds to step S30.

(Q) In step S30, a send-transition is searched for. However, since there is no send-transition at the states WAIT. 2 and FAULT. 2 of the individual processes I and 2 of the current state 105, by the processing of step S33, the processing proceeds to step S70.

(R) As a result, in step S70, the system state 105 (WAIT. 2, FAULT. 2) is detected as deadlock, which is stored in the memory or displayed on the screen, and the processing proceeds to step S80.

(S) In step S80, after the current state 105 is erased from the memory, by taking out an unprocessed send- transition -ALARM and a system state (READY. 0, IDLE. 0) having it from the unprocessed transition stack, the system state 101 is restored, which is stored as a new current state in the memory, and the processing returns to step S20.

(T) Subsequent generation of system states 106 and 107, and stop of validation of transition sequences that follows the system state 107 are similar procedures to the already described generation of the system states 102 and 103 and stop of validation of transition sequences that follows the system state 103.

(U) After that, when, by step S80, the current state returns from the system state 107 (WAIT. 1, FAULT. 0) to the system state 106 (READY. 0, FAULT. 0), the processing proceeds from step S20 to S50, and a received state WAIT. 2 for the unreceived signal ALARM in the channel is found as a next received state from the system state 106.

(V) However, send-transition -REQ in the system state (READY. 0, IDLE. 0) already stored as a validation completion transition is included on the way of transitions of process 1 of the system state 106 (READY. 0, FAULT. 0) from state READY. 0 to state WAIT. 2. Therefore, by proceeding to step S80 according to the processing in step S58, duplicate validation of state transition sequences including such a validation completion transition is avoided.

(W) As a result, in step S80, an unprocessed transition and a system state having it are to be taken out from the unprocessed transition stack. In this case, however, since the unprocessed transition stack is empty, the processing proceeds to step 390 which means all validation is over.

Other Embodiments

The above-described embodiments explicitly utilize the unprocessed transition stack in handling unprocessed transitions in the global validation. However, without using the stack, by recursively executing the basic processing shown below starting the initial system state as the current state, generation and deletion of reachable system states can be made according to information of the state transition graph of each process comprising only executable state transitions of the protocol.

Basic Processing

As a basic processing for the above recursive execution, if unprocessed transitions exist at the current state, each of them is executed to generate a reachable system state from the current state, and the basic processing is executed with the generated system state as its current state, when all unprocessed transitions are processed, the current state is removed from the memory and the current basic processing is finished. If no unprocessed transitions exist at the current state, a determination is made as to whether or not the state is a deadlock, the current state is removed from the memory and the current basic processing is finished.

In the validation method of a protocol of the present invention, without generating all system states and storing them in the memory as in the first conventional method, and without generating all stable states as in the second conventional method, as a first processing step, a state transition graph of each process comprising only executable state transitions of each process is generated according to the transition information which the protocol specification has, at the same time, protocol errors related to the behavior of each process are detected, and, as a second processing step, reachable system states among system states defined by combinations of individual process states and individual channel states are successively generated according to transition information which the state transition graph of each process generated in the first processing step has, and among the generated reachable system states a system state which cannot transit further is detected as deadlock. Therefore, the number of system states checked in the method of the present invention is considerably smaller than the number of system states generated in the first conventional method, or the number of stable states generated in the second conventional method. Further, in the method of the present invention, since not all of validated system states are required to be held, each system state can be erased from the memory when the validation for the system state is completed. As a result, required memory capacity is remarkably reduced, and validation may be carried out with a memory of the same capacity even for a large-scale or complicated protocol specification which is difficult to validate by the first or second conventional method. Further, since searching of all system states or stable states required in the first or second conventional method is not necessary in the present invention, the amount of processing required is considerably reduced, and validation of a large-scale or complicated protocol specification which cannot be completed within a practical time in the conventional methods may be completed within a practical period of time.

In particular, in the second embodiment of the present invention, in the first processing step, in the generation of the state transition graph of each process, a received state of the receiving process is beforehand calculated for each send-transition, which is held as one of transition information. In correspondence to this, in the second processing step, in the generation of a system state after receiving an unreceived signal from a system state including the signal in the channel, the next system state is generated using the previously known received state for the send-transition of the unreceived signal. With such a technique, generation of the system states and detection of deadlock can be simplified and accelerated.

Further, in the third embodiment of the present invention, the last transmitted signal is selected from a plurality of unreceived signals in a channel, and only the system state after receiving the signal is generated. That is, since all of the successive transitions up to the receive-transition for the selected signal are executed to generate the system state, and generation of system states on the way is omitted, generation of the system states and detection of deadlock can be accelerated.

In the fourth embodiment of the present invention, since the process state is advanced to the state reached by executing all of a send-transition and a series of subsequent send-transitions to generate only a system state that includes the state, without generating system states on the way. With such a technique, generation of system states and deadlock detection can be accelerated.

In the fifth embodiment of the present invention, since the process state is advanced to the state reached by executing all of a receive-transition and a series of subsequent send-transitions to generate only a system state that includes the state, without generating system states on the way. With such a technique, production of system states and deadlock detection can be accelerated.

In the sixth embodiment of the present invention, in the generation of the state transition graph of each process in the first processing step, every time a node is added, a state that each of other processes should have at least reached for the process to reach the state represented by the node is beforehand determined as a "least state", which is held as one of the transition information and, in correspondence to this, in the second processing step, in the generation of a next system state from a system state including an unreceived signal in a channel, the least state of each process other than the receiving process, for the transition destination state of the receiving process is compared with the process state constituting the system state from which a new system state is to be generated, and if the least state is more advanced, those processes are all advanced to the least states to generate the next system state. With this technique, generation of system state and deadlock detection can be accelerated.

In the seventh and eighth embodiments of the present invention, in the generation of the state transition graph of each process in the first processing step, when two states in a process are equivalent in the sense that transition sequences following the individual states are identical, the later generated state is marked as equivalence stop state and generation of the state transition graph and detection of protocol errors thereafter are stopped, holding the equivalence stop state as one of the transition information. In the seventh embodiment of the present invention, in the generation of the next system state, when an equivalence stop state is included in a system state, generation of system state to be next generated from that system state is stopped. On the other hand, in the eighth embodiment of the present invention, also when an equivalence stop state is included in any process state transitions between a system state and the system state to be next generated from that system state, generation of the system state to be next generated is stopped to avoid overlapped validation processing. With these techniques, generation of state transition graph is accelerated, and generation of system state and deadlock detection can be accelerated.

In the ninth embodiment of the present invention, in the generation of system states in the second processing step, when a system state reached by a transition sequence beginning with a send-transition from a system state where all channels are empty and a series of subsequent system states are validated, the send-transition at the beginning of the transition sequence is stored as a validation completion transition, and when the stored validation completion transition appears on the way of generation of system states that follow the transition sequence beginning with other send-transition from the above-mentioned system state where all channels are empty, further generation of system states that follow the send-transition is stopped. With this technique, generation of system states and deadlock detection can be accelerated.

The invention being thus described, it will be obvious that the same may be varied in many ways. Such variations are not to be regarded as a departure from the spirit and scope of the invention, and all such modifications as Would be obvious to one skilled in the art are intended to be included within the scope of the following claims.

What is claimed is:

1. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (1) includes determining a received state which is a state to which each receiving process enters by receiving a signal for each send-transition, and storing information on the received state thereof; and wherein said step includes generating a system state after receiving a signal generated from a previous system state where the signal still exists in a channel using the information on the received state.

2. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states detecting a system state which cannot further transit as a deadlock;

wherein said step (2), when a next system state is generated from a system state including a plurality of unreceived signals in a channel, a last transmitted signal is selected from the plurality of unreceived signals, and the system state after reception of the selected signal, is generated as a next system state.

3. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (2), when a next system state is generated by executing a send-transition of a process from a system state where all channels are empty, and one or more send-transitions successively exist following the send-transition, each process is advanced to a state reached by executing the first send-transition and successive send-transitions to generate a next system state.

4. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (2), when a next system state is generated from a system state including an unreceived signal in a channel, and if a process which receives the signal has one or more successive send-transitions at a state after the signal is received, each process is advanced to a state, after a series of send-transitions following the reception of the signal, to generate a next system state.

5. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (1), every time a node is added, a state that each other process should have at least reached for the process to reach the state represented by the node is determined as a least state, and information thereof is stored; and wherein said step (2), when a next system state is generated from a system state including an unreceived signal in a channel, using least state information if a least state of each other process for the state of the transition destination of the receiving process is ahead of the state constituting the system state including the unreceived signal in a channel, the state of the process is advanced to the least state to generate a next system state.

6. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (1)

when two states in a process are equivalent, such that transition sequences following the individual states are identical, a later generated state is marked as an equivalence stop state, generation of the state transition graph and detection of protocol errors thereafter are stopped, and information on the equivalence stop state is stored; and wherein said step (2), using the information of the equivalence stop state, when an equivalence stop state is included in a system state, generation of a system state to be generated next for the system state is stopped.

7. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel skates according to the transition information of the state transition graph of each process and, among the reachable system states, detecting a system state which cannot further transit as a deadlock;

wherein said step (1), when two states in a process are equivalent such that transition sequences following the individual states are identical, a later generated state is marked as an equivalence stop state, generation of the state transition graph and the detection of protocol errors thereafter are stopped, and information of the equivalence stop state is stored; and wherein said step (2), using the information of the equivalence stop state, when an equivalence stop state is included in any process between a system state and a system state to be generated next from the system state, generation of the system state to be generated next is stopped.

8. A method of validating an input protocol specification by checking behavior of the protocol according to transition information of the input protocol specification, to detect protocol errors, said method comprising the steps of:

(1) generating a state transition graph of each process of the input protocol specification, including only executable state transitions of each process according to the transition information of the input protocol specification and, simultaneously detecting protocol errors related to the behavior of each process; and (2) successively generating reachable system states among system states defined by combinations of individual process states and individual channel states according to the transition information of the state transition graph of each process and, among the reachable system states, detecting a system state which cannot further transit as a deadlock;

wherein said step (2), when a system state reached by a transition sequence beginning with a send-transition from a system state where all channels are empty and a series of subsequent system states are validated, the send-transition is stored as a validation completion transition, and when the validation completion transition appears during generation of system states that follow the transition sequence beginning with another send-transition from the above-mentioned system state where all channels are empty, generation of system states that follow the send-transition is stopped.

* * * * *